United States Patent
Deb et al.

(10) Patent No.: US 12,074,969 B2
(45) Date of Patent: Aug. 27, 2024

(54) DEVICE AND METHOD FOR SECURE COMMUNICATION BASED ON QUANTUM CRYPTOGRAPHY

(71) Applicant: Cognizant Technology Solutions India Pvt. Ltd., Chennai (IN)

(72) Inventors: Sandeep Deb, Pune (IN); Aan Singh Chauhan, Pune (IN); Indranil Mitra, London (GB)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 730 days.

(21) Appl. No.: 17/144,607

(22) Filed: Jan. 8, 2021

(65) Prior Publication Data

US 2022/0085987 A1    Mar. 17, 2022

(30) Foreign Application Priority Data

Sep. 16, 2020    (IN) .............................. 202041040087

(51) Int. Cl.
*H04L 9/40*    (2022.01)
*G06F 13/42*    (2006.01)
(Continued)

(52) U.S. Cl.
CPC ........ *H04L 9/0858* (2013.01); *G06F 13/4282* (2013.01); *H04B 10/1141* (2013.01);
(Continued)

(58) Field of Classification Search
CPC .............. H04L 9/0858; H04L 63/0428; G06F 2213/0042; G06F 13/4282; H04B 10/1141; H04B 10/502; H04B 10/61; H04B 10/70
See application file for complete search history.

(56) References Cited

U.S. PATENT DOCUMENTS 8,774,638 B2    7/2014   Duligall
9,002,009 B2    4/2015   Nordholt
(Continued)

OTHER PUBLICATIONS

Duligall et al., "Low cost and compact quantum key distribution", 2006, New Journal of Physics, 17 pages (Year: 2006).*
(Continued)

*Primary Examiner* — Thaddeus J Plecha
(74) *Attorney, Agent, or Firm* — CANTOR COLBURN LLP

(57) ABSTRACT

A transmitter device for a secure communication based on quantum cryptography, the transmitter device comprises a transmitter optical communication module for transmitting light pulses from the transmitter device to a receiver device, and the transmitter optical communication module enables exchange of a quantum key between the transmitter device and the receiver device. The transmitter device comprises transmitter data communication module for exchanging data between the transmitter device and the receiver device, the data is encrypted by the quantum key thereby ensuring a secure communication between the transmitter device and the receiver device. The transmitter device further contains a status display on a front side of the transmitter device for displaying status of the secure communication between the transmitter device and the receiver device.

27 Claims, 12 Drawing Sheets

(51) Int. Cl.
    *H04B 10/114*    (2013.01)
    *H04B 10/50*     (2013.01)
    *H04B 10/61*     (2013.01)
    *H04B 10/70*     (2013.01)
    *H04L 9/08*      (2006.01)
(52) U.S. Cl.
    CPC ........... *H04B 10/502* (2013.01); *H04B 10/61* (2013.01); *H04B 10/70* (2013.01); *H04L 63/0428* (2013.01); *G06F 2213/0042* (2013.01)

(56) References Cited

U.S. PATENT DOCUMENTS

| | | | |
|---|---|---|---|
| 9,680,641 B2 | 6/2017 | Nordholt | |
| 2013/0101119 A1* | 4/2013 | Nordholt | H04L 9/0852 380/278 |
| 2017/0237505 A1* | 8/2017 | Lucamarini | H04L 9/0858 398/185 |

OTHER PUBLICATIONS

J L Duligall, "Low Cost and Compact Quantum Key Distribution" Oct. 3, 2006; URL: http://citeseerx.ist.psu.edu/viewdoc/download;jsessionid=DD01D4EE19BC421EEB22E7191ECA67D5?doi=10.1.1.251.5378&rep=rep1&type=pdf.

Osama Elmabrok, "Wireless Quantum Key Distribution in Indoor Environments" Dec. 10, 2017; URL: https://arxiv.org/pdf/1605.05092.pdf.

* cited by examiner

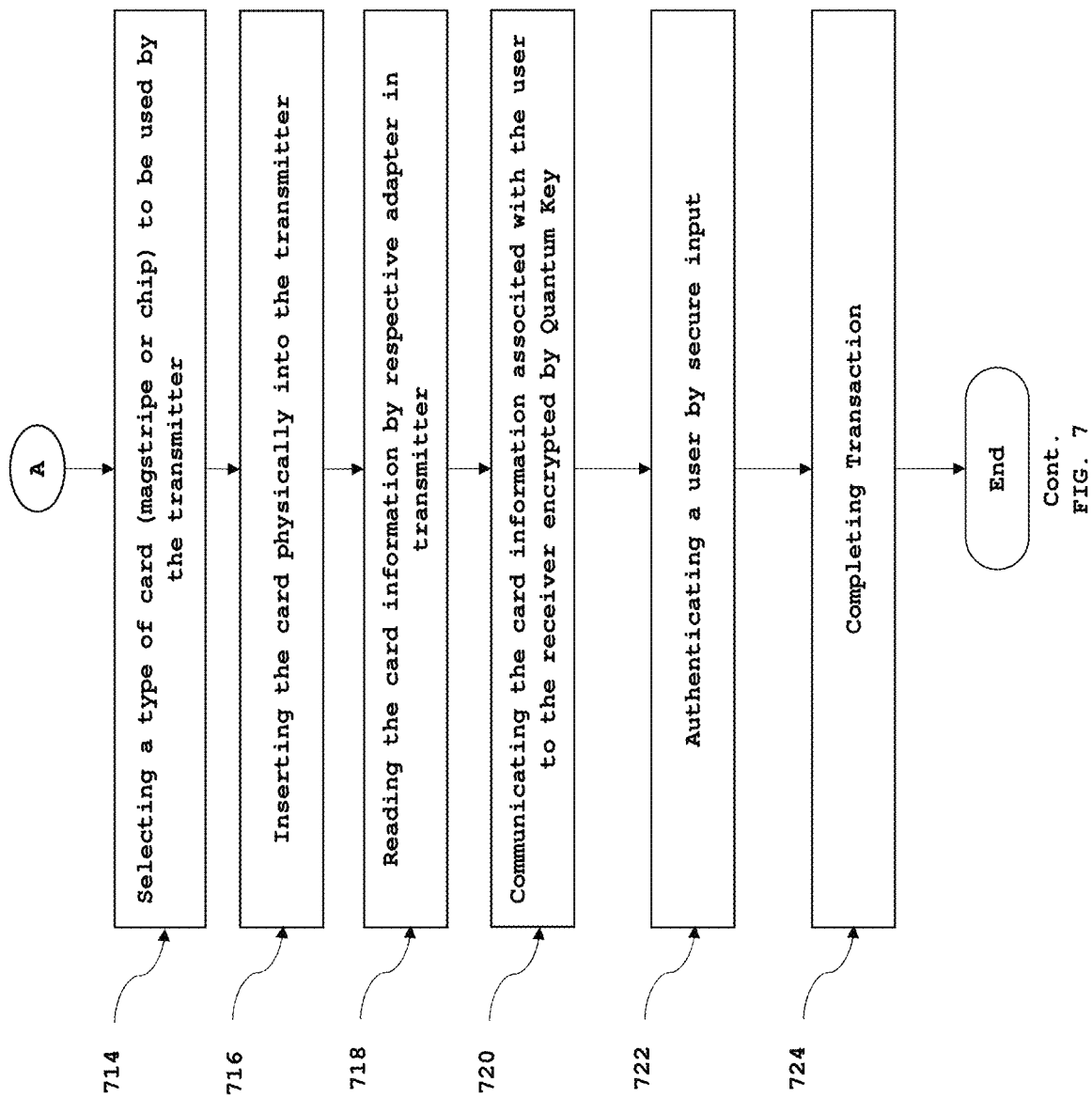

DEVICE AND METHOD FOR SECURE COMMUNICATION BASED ON QUANTUM CRYPTOGRAPHY

CROSS REFERENCE TO RELATED APPLICATION

This application is related to and claims the benefit of Indian Patent Application Number 202041040087 filed on Sep. 16, 2020, the contents of which are herein incorporated by reference in their entirety.

FIELD OF THE INVENTION

The present invention relates generally to the field of secure data communication technologies. More particularly, the present invention relates to secure information exchange by leveraging quantum enhanced cryptographic techniques.

BACKGROUND OF THE INVENTION

In quantum communication, two parties exchange information using quantum bits or Q-bits. Single photons can be used as quantum bits by encoding information using polarization states. By using established protocols, the two parties produce a shared random series of bits known only to them, which can then be used as secret keys in subsequent encryption and decryption of messages. The process of producing such keys through quantum communication is also called quantum key distribution (QKD). QKD is a field in cryptography, which builds upon quantum foundations to ensure that information can be passed between participants in a provably secure way. The cryptographic strength in this case does not depend or rely on the need of computational power. Rather, it leverages probabilistic certainties (statistical uncertainties) of quantum particles to detect any interception and/or tamper of information during exchange.

Devices for reading magnetic stripe and/or chip cards are used in particular in automated teller machines, automatic cash register systems, automatic cash safes and payment terminals. The magnetic stripe and/or chip card is in particular an EC (electronic cash) card or a credit card by means of which purchased goods are paid or money is to be withdrawn. In order to obtain the account data stored on the magnetic stripe and/or chip card and the associated PIN, illegal skimming attacks are performed in which a so-called skimming module is provided in front of the slot into which the magnetic stripe and/or chip card is inserted, by means of which skimming module the data of the magnetic stripe and/or chip card are read out. In addition, the PIN is spied out, for example, by means of a camera which is mounted in a hidden manner or a manipulation of the keypad so that the person performing this skimming attack knows both the data of the magnetic stripe and/or chip card and the associated PIN and thus can withdraw money or make purchases in an unauthorized manner.

Hence, there is a need of device and a method by which one can stop skimming attacks and can detect the presence of an eavesdropper while performing such transactions.

The main object of the invention is to provide devices and a method by which one can stop skimming attacks. Another object of the invention is to detect the presence of an eavesdropper thereby ensuring that the sensitive information is not intercepted by anyone. Yet another object of the invention is to miniaturize a transmitter device used for quantum communication to ensure it is portable and does not require a dedicated power source.

SUMMARY OF THE INVENTION

The present invention discloses a transmitter device, a receiver device and a method for secure communication based on quantum cryptography. In particular, the present invention provides the transmitter device, which is portable, passive in nature, small enough to be hand-held and a secure personal adapter for existing ATM, Credit and Debit cards. The present invention further provides for optical alignment between the transmitter device and the receiver device when the transmitter device is physically docked into the receiver device. Further, the present invention provides power to the passive hand-held transmitter device through the receiver device when the transmitter device is physically docked into the receiver device.

Further, the present invention provides an optical communication channel and a data communication channel between the transmitter device and the receiver device. The optical communication channel is used for securely sharing a Quantum Key between the transmitter device and the receiver device. The data communication between the transmitter device and the receiver device through the data communication channel is encrypted using the shared Quantum Key.

According to the invention, a transmitter device for a secure communication based on quantum cryptography, the transmitter device comprises a transmitter optical communication module for transmitting light pulses from the transmitter device to an optical channel, the optical communication module enables exchange of a quantum key. The transmitter device further comprises a transmitter data communication module for communicating data to and from the transmitter device, the data is encrypted by the quantum key thereby ensuring a secure communication. The transmitter device also has a transmitter control module communicatively coupled to the transmitter data communication module and the transmitter optical communication module, the transmitter control module controls both the transmitter optical communication module and the transmitter data communication module.

The transmitter device has one or more alignment guide(s) located on one or more side surface(s), wherein the one or more of alignment guide(s) enables physical docking of the transmitter device.

The transmitter device further contains a status display communicatively coupled to the transmitter control module and is located on a front side of the transmitter, wherein the status display shows the status of the secure communication.

A receiver device for a secure communication based on quantum cryptography, the receiver device comprises a receiver optical communication module for receiving light pulses through the optical channel, the receiver optical communication module enables exchange of a quantum key between the transmitter device and the receiver device. The receiver device further comprises a receiver data communication module for exchanging data between the transmitter device and the receiver device, the data is encrypted by the quantum key thereby securing the data communication between the transmitter device and the receiver device.

The receiver device further comprises a receiver control module communicatively coupled to the receiver optical communication module and the receiver data communication module, the receiver control module controls the optical communication and the data communication between the transmitter device and the receiver device. The receiver device has one or more alignment rod(s) protruding out from a flat surface of the receiver device, the one or more alignment rod(s) insert into one or more alignment guides thereby ensuring physical docking and optical alignment of the transmitter device and the receiver device 400. The receiver device also has a user interface communicatively coupled to the receiver control module, the user interface displays status information of the secure communication between the transmitter device and the receiver device to a user, the status information is received from the receiver control module, wherein the user interface alerts the user in case of an eavesdrop and the receiver device aborts an on-going transaction.

The method for a secure communication based on quantum cryptography between a transmitter device and a receiver device, the method comprises docking the transmitter device into the receiver device physically, wherein one or more alignment rod(s) of the receiver device insert into one or more alignment guide(s). The method further comprises providing power to the transmitter device from the receiver device when a male data communication port in the receiver device gets physically docked into a female data communication port of the transmitter device The method also contains recognizing the transmitter device as a valid device, checking for a clear line of an optical channel between a transmitter optical communication module and a receiver optical communication module and checking for polarization alignment between the transmitter optical communication module and the receiver optical communication module.

The method further comprises exchanging a quantum key between the transmitter device and the receiver device through the optical channel governed by a quantum cryptography protocol. Further, the user selects a type of card inserted into a slit of the transmitter device. The method communicates the card information read by a type of adapter of the transmitter device based on the type of card selected, the card information is encrypted by the quantum key and communicated to the receiver device by the transmitter device through the data communication channel.

The method also contains authenticating a user by a secure input provided by the user at the receiver device and completing a transaction based on user inputs provided by the user.

BRIEF DESCRIPTION OF THE ACCOMPANYING DRAWINGS

The present invention is described by way of embodiments illustrated in the accompanying drawings wherein:

FIG. 5b illustrates a detailed view of the part of the Receiver Device 400 shown in FIG. 5a;

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1A:
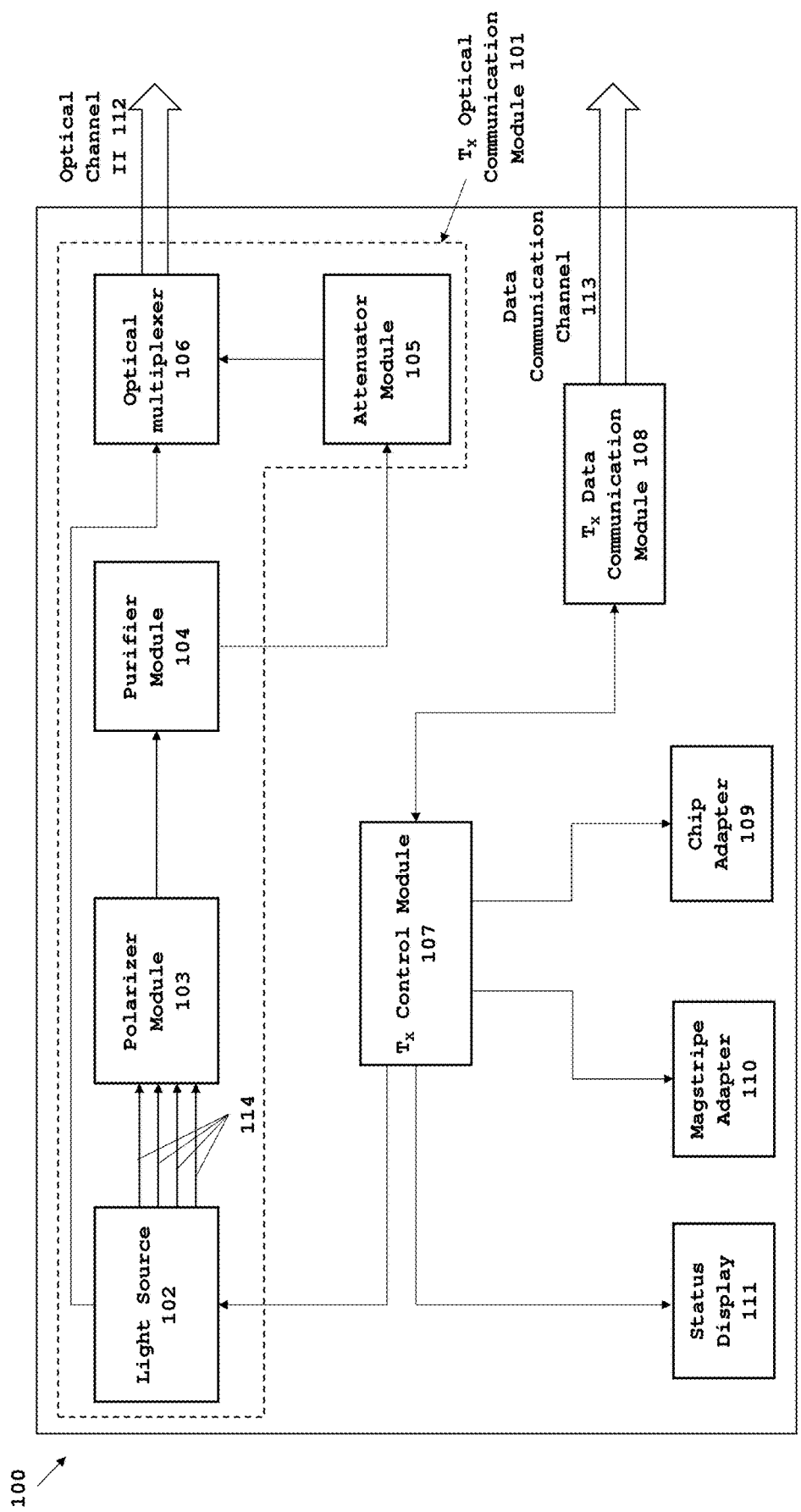
FIG. 1a illustrates a block diagram of a Transmitter Device 100 for secure communication based on quantum cryptography, in accordance with an embodiment of the present invention.

Referring to FIG. 1a, in an embodiment of the present invention, the Transmitter Device 100 comprises a Transmitter Optical Communication Module 101 hereinafter referred to as a T1 101, a Transmitter Control Module 107 hereinafter referred to as a T2 107, a Transmitter Data Communication Module 108 hereinafter referred to as a T3 108, a Chip Adapter 109, a Magstripe Adapter 110 and a Status Display 111. The T2 107 is communicatively coupled to the T1 101, the T3 108, the Chip Adapter 109, the Magstripe Adapter 110 and the Status Display 111. In an embodiment of the present invention, the T2 107 comprises an in-built processor and a memory and the various modules and components of the transmitter device 100 are operated via the processor executing instructions stored in the memory.

The T1 101 includes a Light Source 102, a Polarizer Module 103, a Purifier Module 104, an Attenuator Module 105, an Optical Multiplexer 106 and a plurality of optical channels I 114. The Light Source 102 is communicatively coupled to the Polarizer Module 103, the Optical Multiplexer 106 and the T2 107. In an embodiment, the Light Source 102 is optically coupled to the Polarizer Module 103 via a plurality of optical channels I 114. The Polarizer Module 103 is communicatively coupled to the Purifier Module 104. The Purifier Module 104 is communicatively coupled to the Attenuator Module 105. The Attenuator Module 105 is communicatively coupled to the Optical Multiplexer 106. An Optical Channel II 112 is present for transmitting light pulses from the Optical Multiplexer 106. In an embodiment of the present invention, the communicative coupling may include, but not limited to, electrical coupling, electronic coupling, optical coupling or the like. The type of communication of the communicative coupling may include, but not limited to, simplex communication, half-duplex communication, full-duplex communication or the like.

Figure 1B:
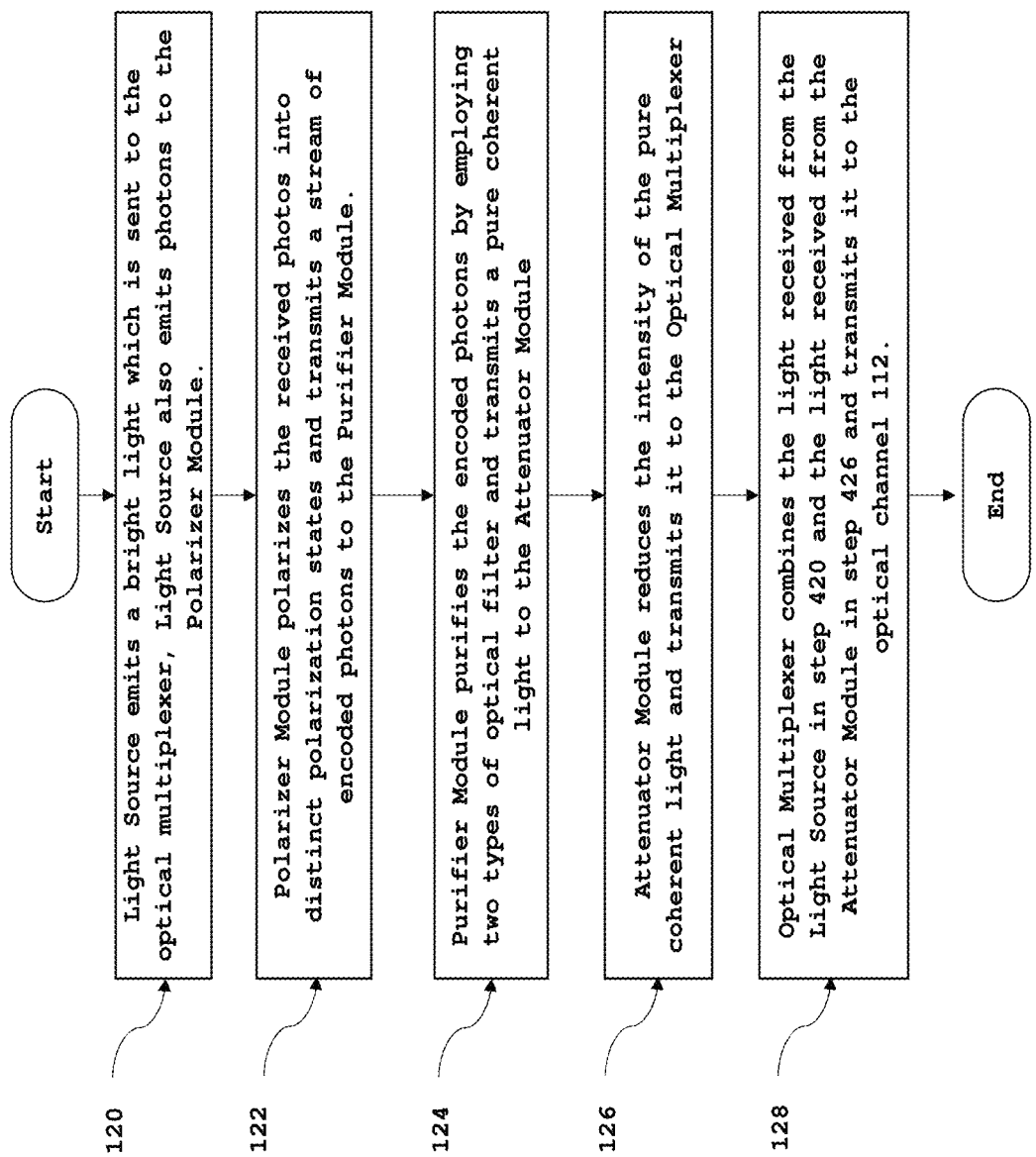
FIG. 1b is a flowchart illustrating a method of working of the Transmitter Device 100, in accordance with various embodiments of the present invention.

Referring to FIG. 1a and FIG. 1b, at step 120, the T2 107 instructs the Light Source 102 to emit a bright light, which is transmitted to the Optical Multiplexer 106. In an embodiment of the invention, the Light Source 102 has four light emitting diodes (LEDs) which are driven by the T2 107 using a pulse mode, thus generating light pulses (bunched photons) comprising photons. The photons comprise information communicated by the T2 107. The photons are further used for transmitting a quantum key. The four LEDs flicker rapidly, controlled by signals communicated by the T2 107 and the photons emitted are transmitted to the Polarizer Module 103 via the plurality of optical channels I 114. The Polarizer Module 103 has four input ports and each of the four LEDs is connected to one of the four input ports of the Polarizer Module 103 via one of the plurality of optical channels I 114.

At step 122, the Polarizer Module 103 polarizes the received photons into one or more distinct first polarization states based on the optical channels I 114 receiving the photons for encoding the photons. Each optical channel's photon is converted into a fixed and distinct first polarization state (e.g. 0° for first optical channel, 90° for second optical channel, 45° for third optical channel and 135° for fourth optical channel). This helps in encoding information communicated by the T2 107 based on different polarization states of photons. The encoded photons generated by the Polarizer Module 103 are transmitted as a stream of photons to the Purifier Module 104.

At step 124, the stream of photons received by the Purifier Module 104 has certain anomalies, which if not remedied, would lead to inefficiencies. Firstly, it may contain multiple frequencies and secondly it may contain aberrations introduced by imperfect, dirty or damaged optics. The purifier module 104 filters the incoming stream of photons by employing one or more optical filters, but is not limited to, two types of optical filters. First filter is a spatial filter, which scrubs the aberrations introduced by dirty or imperfect optics. Second filter is a spectral filter (e.g. a band filter) which passes only a particular band of frequency of light. Thus, the Purifier Module 104 generates and transmits a pure coherent light to the Attenuator Module 105.

At step 126, the pure coherent light received by the Attenuator Module 105 still contains many photons, even though the Light Source 102 emitted the photons for a very short duration. If the Optical Channel II 112 is to be quantum secure, then the maximum number of photons emitted per pulse should not exceed one photon per pulse. The Attenuator Module 105 reduces the rate of photons to a maximum of one photon per pulse for making the optical channel II (112) quantum secure.

At step 128, the Optical Multiplexer 106 receives the encoded photons from the Attenuator Module 105. It also receives the bright light in the form of light pulses comprising photons transmitted from the Light Source 102. The Optical Multiplexer 106 combines the two lights comprising photons coming from the Attenuator Module 105 and the Light Source 102 and transmits it over the Optical Channel II 112. It should be noted that at any point of time, the Optical Multiplexer 106 would not receive inputs from the Light Source 102 and the Attenuator Module 105 simultaneously.

In an embodiment of the present invention, the T2 107 may include, e.g. an FPGA (Field Programmable Gate Array) or an ASIC (Application Specific Integrated Circuit). The T2 107 has custom logic encoded in the hardware and it controls the T1 101 for optical communication as well as the T3 108 for data communication. The T2 107 also controls the Chip Adapter 109, the Magstripe Adapter 110 and the Status Display 111. The Chip Adapter 109 reads a chip-based card when inserted into the Transmitter Device 100. The Magstripe Adapter 110 reads a magnetic-strip based card when inserted into the Transmitter Device 100. The T2 107 instructs either the Chip Adapter 109 or the Magstripe Adapter 110 to read the card information based on the type of card inserted into the Transmitter Device 100. In case of a magstripe card, the user may be instructed to reinsert the card for the Magstripe Adapter to read the information via a static read head. The Status Display 111 displays the status of an on-going transaction.

Figure 2A:
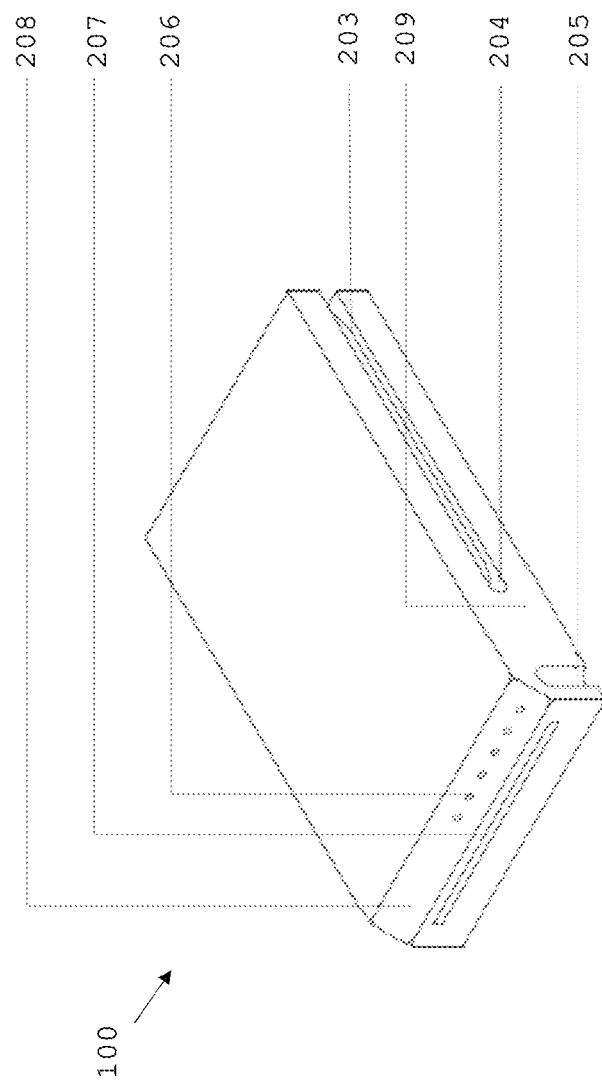
FIGS. 2a and 2b illustrates a front view and a rear view respectively of the Transmitter Device 100 for secure communication based on quantum cryptography, in accordance with an embodiment of the present invention.
Figure 2B:
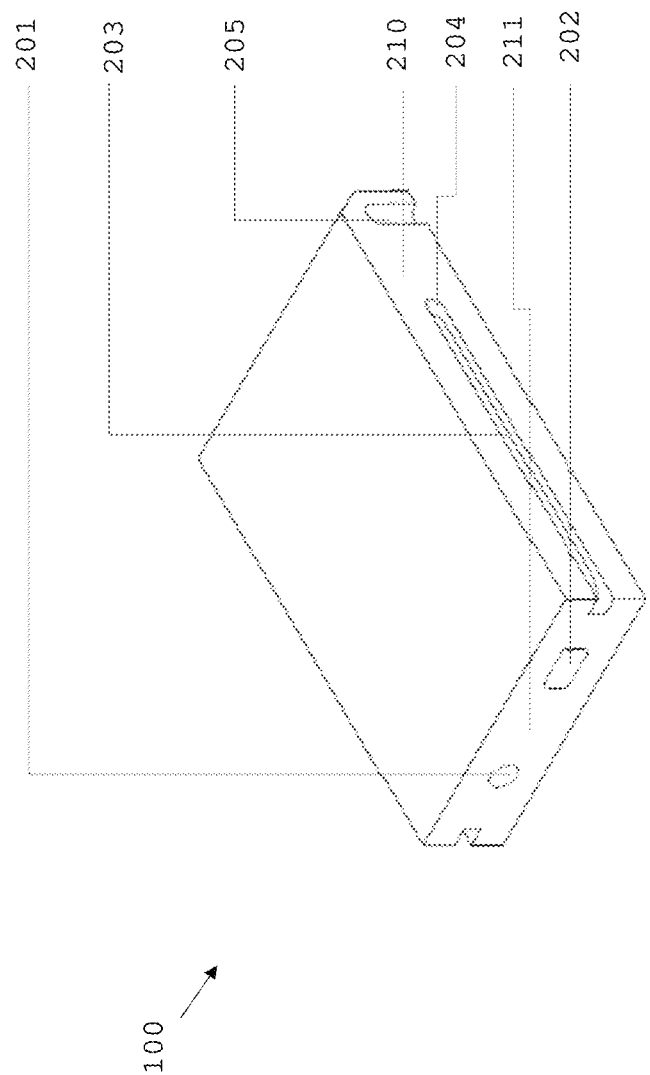

Referring to FIG. 1a, FIG. 2a and FIG. 2b, in an embodiment of the present invention, the Transmitter Device 100 comprises an Optical Port 201, a Data Port 202, a pair of Alignment Guides 203, a pair of Dock Lock Guides 204, a pair of Finger Grips 205, six Status Lights 206, a Card Slot 207, a Front Surface 208, a First Side Surface 209, a Second Side Surface 210 and a Rear Surface 211. The Optical Port 201 and the Data Port 202 are present on the Rear Surface 211. The pair of Alignment Guides 203 are present on the First Side Surface 209 and the Second Side Surface 210. The pair of Dock Lock Guides 204 are present on the First Side Surface 209 and the Second Side Surface 210. The pair of Finger Grips 205 is present on the First Side Surface 209 and the Second Side Surface 210.

The T3 108 includes the Data Port 202. The Data Port 202 derives power when inserted into a data host device and supplies power to various components of the Transmitter Device 100. The power is supplied (not shown in FIG. 10a) to the Light Source 102, the T2 107, the Chip Adapter 109, the Magstripe Adapter 110 and the Status Display 111. In an embodiment of the present invention, the Data Port 202 may be of any type of Universal Serial Bus (USB), e.g. Type-B USB, Type-C USB or the like.

The Optical Port 201 transmits the output of the Optical Multiplexer 106 to the Optical Channel II 112, the Optical Channel II 112 here is e.g., a free-space medium.

The Data Port 202 enables data communication via a Data Communication Channel 113 and is controlled by the T2 107.

The pair of Alignment Guides 203 enable physical docking of the Transmitter Device 100 when the Transmitter Device 100 is inserted into a receiver. The pair of Dock Lock Guides 204 ensure soft locking of the Transmitter Device 100, and provides protection against misalignment in case of slope and accidental bumps. The pair of Finger Grips 205 enable a user to hold the Transmitter Device 100 using the user's fingers.

The Status Display 111 shows the status of an on-going transaction. In an embodiment, the Status Display 111 comprises the six Status Lights 206, the six Status Lights 206 are present on the Front Side 208 of the Transmitter Device 100. The six Status Lights 206 are e.g., six LED lights and each of the six LED lights glow upon status change of the on-going transaction.

The Card Slot 207 in the form of a slit is present at the Front Side 208 of the Transmitter Device 100 for inserting a payment card into the Transmitter Device 100.

Figure 3A:
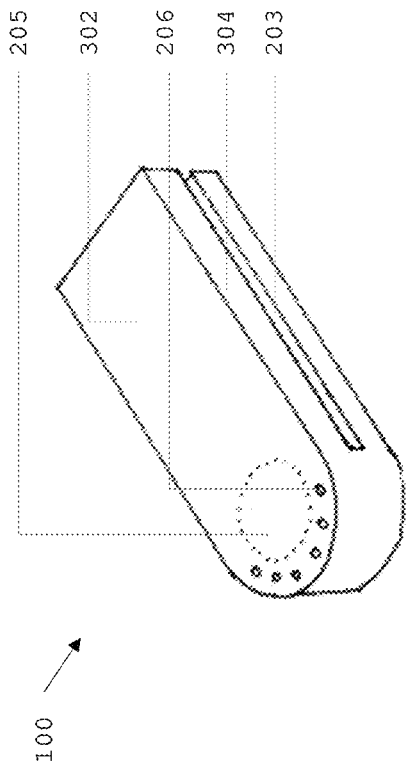
FIG. 3a and FIG. 3b illustrate a front view and a rear view respectively of the Transmitter Device 100 for secure communication based on quantum cryptography, in accordance with another embodiment of the present invention.
Figure 3B:
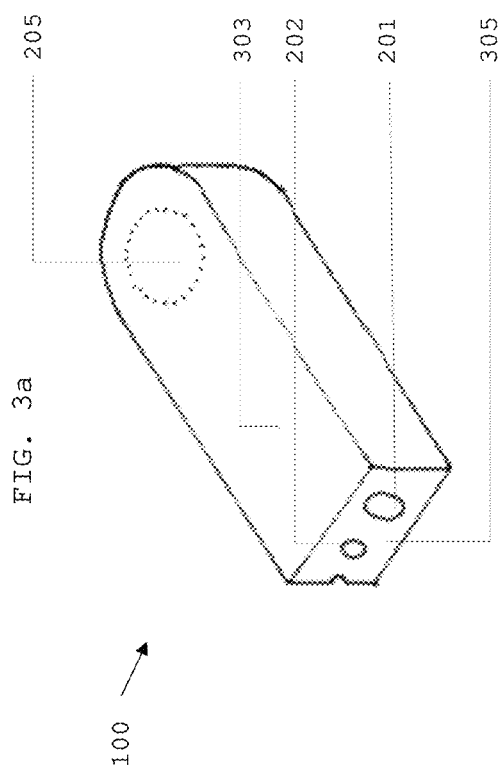

Referring to FIG. 3a and FIG. 3b, in an another embodiment of the present invention, the Transmitter Device 100 comprises an Optical Port 201, a Data Port 202, an Alignment Guide 203, a pair of Finger Grips 205, six Status Lights 206, a Top Surface 302, a Bottom Surface 303, a Side Surface 304 and a Rear Surface 305. The Optical Port 201 and the Data Port 202 are present on the Rear Surface 305. The Alignment Guide 203 is present on the Side Surface 304. The pair of Finger Grips 205 are present on the Top Surface 302 and the Bottom Surface 303.

The Optical Port 201 transmits the output of the Optical Multiplexer 106 to the Optical Channel II 112, the Optical Channel II 112 here is e.g., a free-space medium.

The Data Port 202 enables data communication via the Data Communication Channel 113 and is controlled by the T2 107. The Data Port 202 derives power when inserted into the receiver and supplies power to various components of the Transmitter Device 100. In an embodiment of the present invention, the Data Port 202 may include, e.g. a TRRS (Tip Ring Ring Sleeve) type.

The Alignment Guide 203 enables physical docking of the Transmitter Device 100 when the Transmitter Device 100 is inserted into the receiver. The pair of Finger Grips 205 enable a user to hold the Transmitter Device 100 using the user's fingers.

The Status Display 111 shows the status of an on-going transaction. In an embodiment, the Status Display 111 contains the six Status Lights 206, the six Status Lights 206 are present on the Top Surface 302 of the Transmitter Device 100. The six Status Lights 206 may include e.g., six LED lights and each of the six LED lights glow upon status change of the on-going transaction.

There is no need of a card slot or card to be inserted into the Transmitter Device 100 as the financial information is stored in a chip and the chip is hard burnt into the Transmitter Device 100 (just like it is hard burnt in the payment card).

Figure 4A:
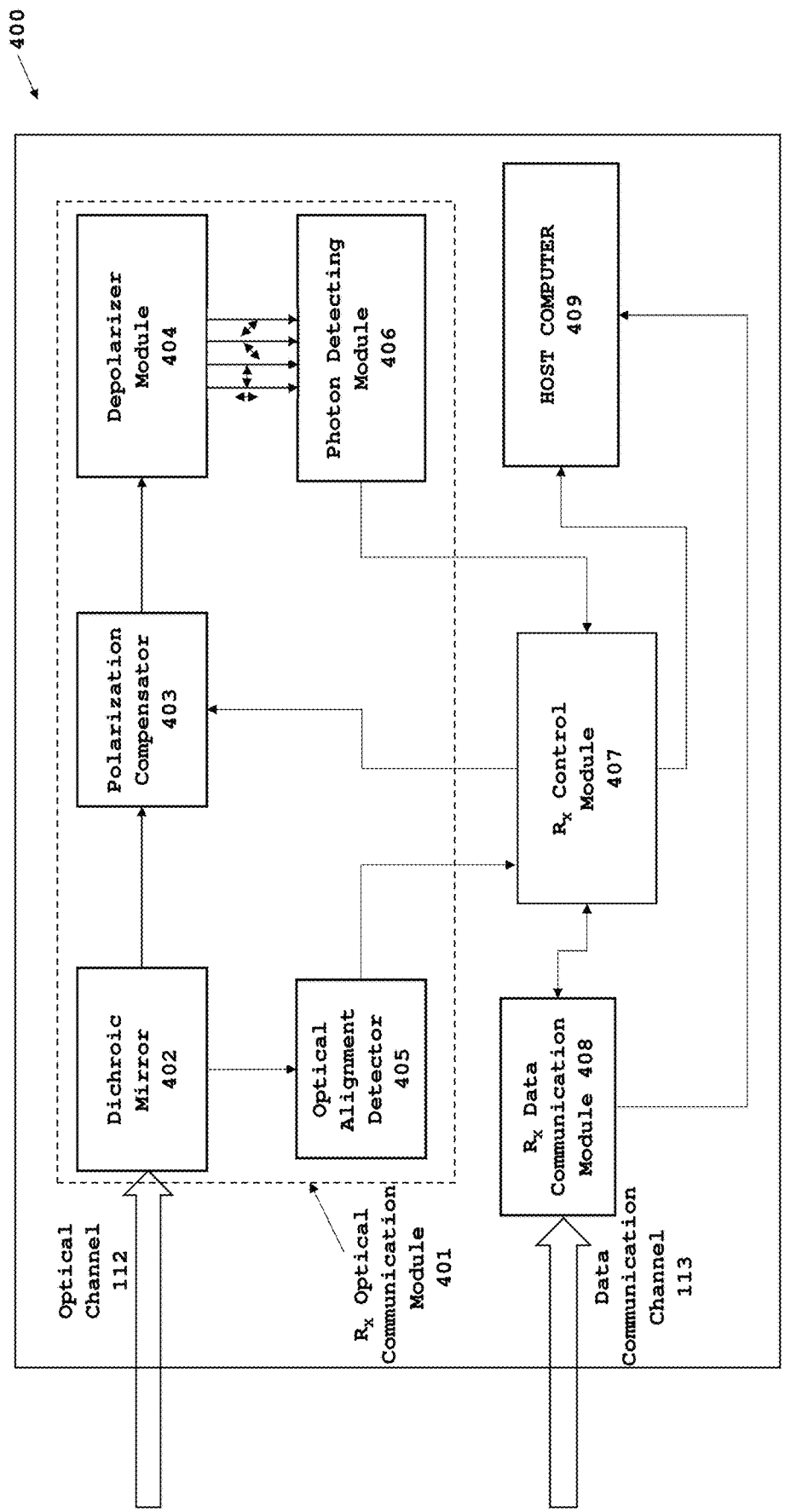
FIG. 4a illustrates a block diagram of a Receiver Device 400 for secure communication based on quantum cryptography, in accordance with an embodiment of the present invention.

Referring to FIG. 4a, in an embodiment of the present invention, a Receiver Device 400 comprises a Receiver Optical Communication Module 401 hereinafter referred to as a R1 401, a Receiver Control Module 407 hereinafter referred to as a R2 407, a Receiver Data Communication Module 408 hereinafter referred to as a R3 408 and a Host Computer 409. The R2 407 is communicatively coupled to the R1 401, the R3 408 and the Host Computer 409. In an embodiment of the present invention, the R2 407 comprises an in-built processor and a memory and the various modules and components of the receiver device 400 are operated via the processor executing instructions stored in the memory.

The R1 401 includes a Dichroic Mirror 402, a Polarization Compensator 403, a Depolarizer Module 404, an Optical Alignment Detector 405 and a Photon Detecting Module 406. The Dichroic Mirror 402 receives the light pulses from the Optical Channel II 112. The Dichroic Mirror 402 is communicatively coupled to the Polarization Compensator 403 and the Optical Alignment Detector 405. The Polarization Compensator 403 is communicatively coupled to the Depolarizer Module 404. The Depolarizer Module 404 is communicatively coupled to the Photon Detecting Module 406. The R2 407 is communicatively coupled to the Photon Detecting Module 406, the Optical Alignment Detector 405 and the Polarization Compensator 403. In an embodiment of the present invention, the communicative coupling may include, but not limited to, electrical coupling, electronic coupling, optical coupling or the like. The type of communication of the communicative coupling may include, but not limited to, simplex communication, half-duplex communication, full-duplex communication or the like.

A Power Supplying Unit (not shown in FIG. 4a) provides power to various components of the Receiver Device 400. The power is supplied to the Polarization Compensator 403, the Photon Detecting Module 406, R2 407, the R3 408, and the Host Computer 409. The R3 408 includes e.g., a USB host. The USB host provides power when the Data Port 202 is inserted into the USB host of the Receiver Device 400 and supplies power to various components of the Transmitter Device 100. The USB host may be of any type, e.g. Type-B, Type-C or the like, but has to be compatible with the Data port 202 on the Transmitter Device 100.

Figure 4B:
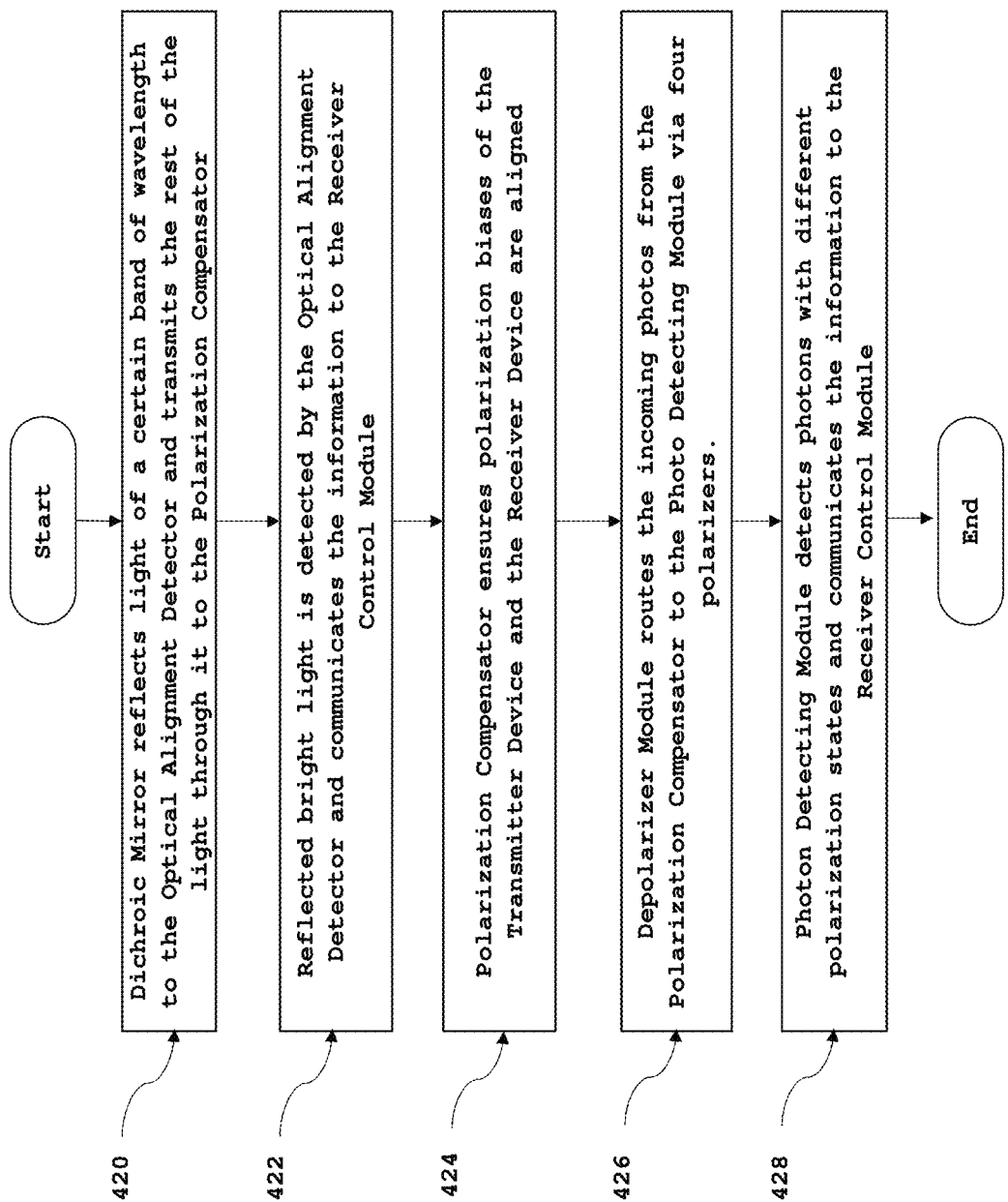
FIG. 4b is a flowchart illustrating a method of working of the Receiver Device 400, in accordance with various embodiments of the present invention.

Referring to FIGS. 4a and 4b, at step 420, the Dichroic Mirror 402 receives the combined light pulses comprising the photons and the pure coherent light comprising the encoded photons from the optical channel II (112) and further splits the light pulses in a first portion and a second portion. In an embodiment of the present invention, the first portion of the light pulses reflect light of a certain band of wavelength (the bright light generated by the Light Source 102) and the second portion of the light pulses are transmitted through the dichroic mirror (402) (the light transmitted by the Attenuator Module 105). The splitting of the light pulses is based on different wavelengths of the light pulses.

At step 422, the first portion of the light pulses is transmitted to the Optical Alignment Detector 405. Once, the first portion of the light pulses is detected by the Optical Alignment Detector 405, the Optical Alignment Detector 405 communicates to the R2 407 for determining whether the Optical Channel II 112 is clear for optical communication or is not clear for optical communication.

At step 424, the second portion of the light pulses are transmitted through the Dichroic Mirror 402 is received by the Polarization Compensator 403. The Polarization Compensator 403 takes into account any manufacturing defects of the T1 101 and adjusts the polarization detection optics of the Receiver Device 400 to determine absence of relative difference between the polarizations of the Transmitter Device 100 and the Receiver Device 400. During an initialization phase, the Transmitter Device 100 initiates a sequence of polarized light pulses of prolonged duration, intended for compensating the polarization, using a specific light frequency, which is trapped within the Polarization Compensator 403 using the Dichroic Mirror 402. The Polarization Compensator 403 comprises an optical mechanism in an adjustable frame and decides on the orientation, which provides maximum/minimum intensity of received light pulses, thus providing aligned polarization biases of the Transmitter Device 100 and the Receiver Device 400. This results in reducing communication errors and hence increasing the efficiency of key generation.

At step 426, the photons that are used for Quantum Key exchange are chosen to be of a frequency that are not reflected by the Dichroic Mirror 402 and are transmitted through the Polarization Compensator 403 to the Depolarizer Module 404. The polarization compensated light transmitted by the Polarization Compensator 403 is received by the Depolarizer Module 404. The Depolarizer Module 404 routes the incoming single photons randomly through a set of four polarizers oriented along horizontal) (0°), vertical) (90°), right (45°) and left (135°) biases. If the incoming photon passes through the randomly chosen bias, it is detected in the Photon Detecting Module 406.

At step 428, the four parallel set of photons are emitted to the Photon Detecting Module 406. The Photon Detecting Module 406 detects a second polarization state associated with the photons coming from a plurality of optical channels. In an embodiment of the invention, the plurality of optical channels are four optical channels. When it receives a photon from first of the four optical channels, it detects that it received the photon with 0° polarization state. Likewise, it detects photons with different polarization states, i.e. 90°, 45° and 135° when the photon comes from second of the four optical channels, third of the four optical channels and fourth of the four optical channels respectively. Whenever the Photon Detecting Module 406 receives a photon, it detects the photon and further communicates the R2 407 that it has received the photon with a certain second polarization state, i.e. 0°, 90°, 45° or 135°.

In an embodiment of the present invention, the R2 407 may include, e.g. an FPGA (Field Programmable Gate Array) or an ASIC (Application Specific Integrated Circuit). The R2 407 has a hardcoded logic encoded in the hardware and it controls the R1 401 for optical communication as well as the R3 408 for data communication. The R2 407 also controls the Host Computer 409, and it sends status messages of the on-going transaction between the Transmitter Device 100 and the Receiver device 400 to the Host Computer 409. The Host Computer 409 includes a user interface for displaying detailed status messages of the on-going transaction between the Transmitter Device 100 and the Receiver device 400.

Figure 5A:
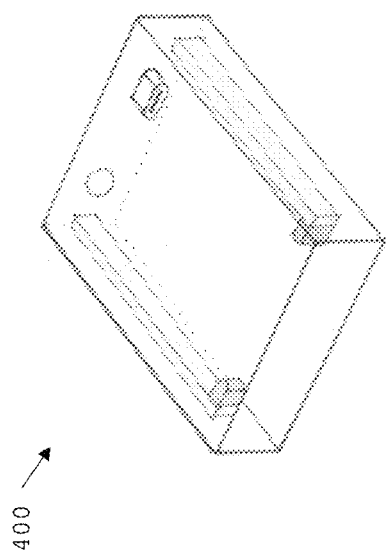
FIG. 5a illustrates a front view of a part of the Receiver Device 400 for secure communication based on quantum cryptography, in accordance with an embodiment of the present invention.
Figure 5B:
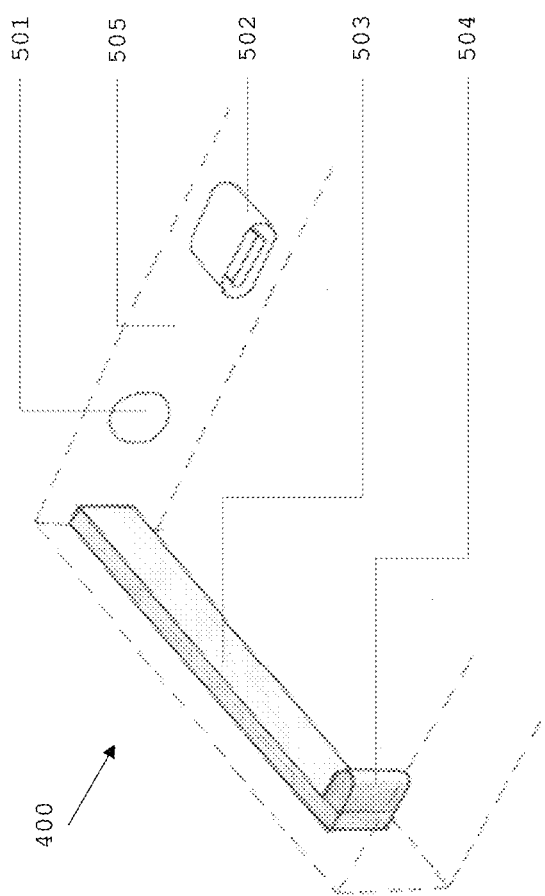

Referring to FIG. 5a and FIG. 5b, in an embodiment of the present invention, the Receiver Device 400 comprises an Optical Port 501, a Data Host 502, a pair of Alignment Rods 503, a pair of Dock Locks 504 and a Flat Surface 505. The Optical Port 501 and the Data Host 502 are present on the Flat Surface 505. The pair of Alignment Rods 503 are located on the Flat Surface 505 and they protrude out perpendicularly from the Flat Surface 505. The pair of Dock Locks 504 are present on each of the pair of Alignment Rods 503.

The pair of Alignment Rods 503 enable physical docking of the Transmitter Device 100 when the Transmitter Device 100 is inserted into the Receiver device 400.

The Optical Port 501 is used for optical communication between the Receiver Device 400 and the Transmitter device 100. The Optical Port 501 receives the output of the Optical Multiplexer 106 to the Optical Channel II 112, the Optical Channel II 112 here is e.g., a free-space medium.

The Data Host 502 enables data communication via the Data Communication Channel 113 between the Receiver Device 400 and the Transmitter Device 100 and is controlled by the R2 407.

The pair of Dock Locks 504 ensure soft locking of the Transmitter Device 100 and provides protection against misalignment in case of slope and accidental bumps.

Figure 5D:
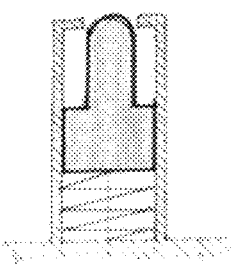
FIG. 5d illustrates a cross-sectional view of the Dock Lock 504 shown in FIG. 5b, the Dock Lock 504 being in a compressed state.
Figure 5C:
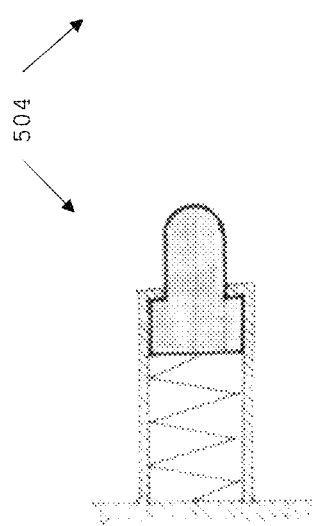
FIG. 5c illustrates a cross-sectional view of a Dock Lock 504 shown in FIG. 5b, the Dock Lock 504 being in a relaxed state.

Referring to FIG. 5c, one of the pair of Dock Locks 504 is in relaxed state when the transmitter device 100 is not present in the receiver device 400 or is in a locked state when the transmitter device 100 is present in the receiver device 400.

Referring to FIG. 5d, the one of the pair of Dock Lock 504 is in compressed state when the pair of Alignment Rods 503 is inserted into the pair of Alignment Guides 203 and is not in a lock state.

Figure 6:
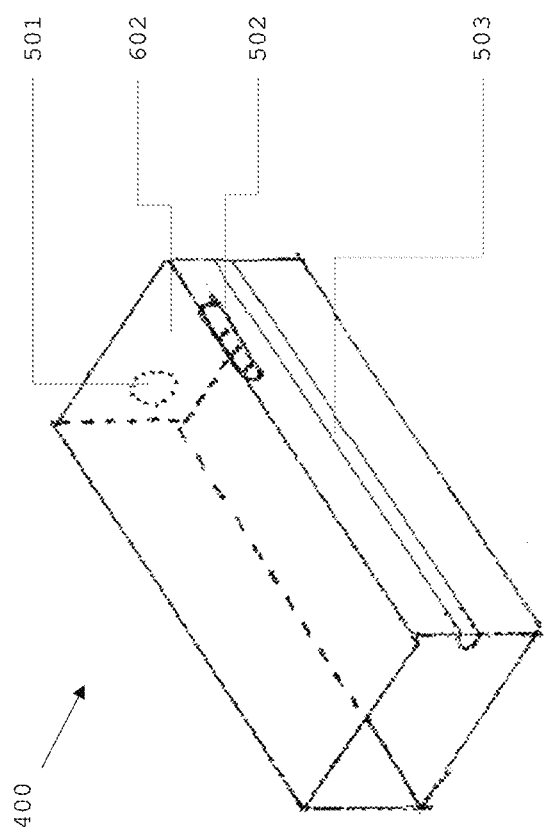
FIG. 6 illustrates a front view of a part of the Receiver Device 400 for secure communication based on quantum cryptography, in accordance with another embodiment of the present invention.

Referring to FIG. 6, in another embodiment of the present invention, the Receiver Device 400 comprises an Optical Port 501, a Data Host 502, an Alignment Rod 503 and a Flat Surface 602. The Optical Port 501 and the Data Host 502 are present on the Flat Surface 602. The Alignment Rod 503 is fixed on the Flat Surface 602 and it protrudes out perpendicular from the Flat Surface 602 of the receiver device 400.

The Alignment Rod 503 enables physical docking of the Transmitter Device 100 when the Transmitter Device 100 is inserted into the Receiver device 400.

The Optical Port 501 is used for optical communication between the Receiver Device 400 and the Transmitter device 100. The Optical Port 501 receives the output of the Optical Multiplexer 106 to the Optical Channel II 112, the Optical Channel II 112 here is e.g., a free-space medium.

The Data Host 502 enables data communication via the Data Communication Channel 113 between the Receiver Device 400 and the Transmitter Device 100 and is controlled by the R2 407.

Figure 7:
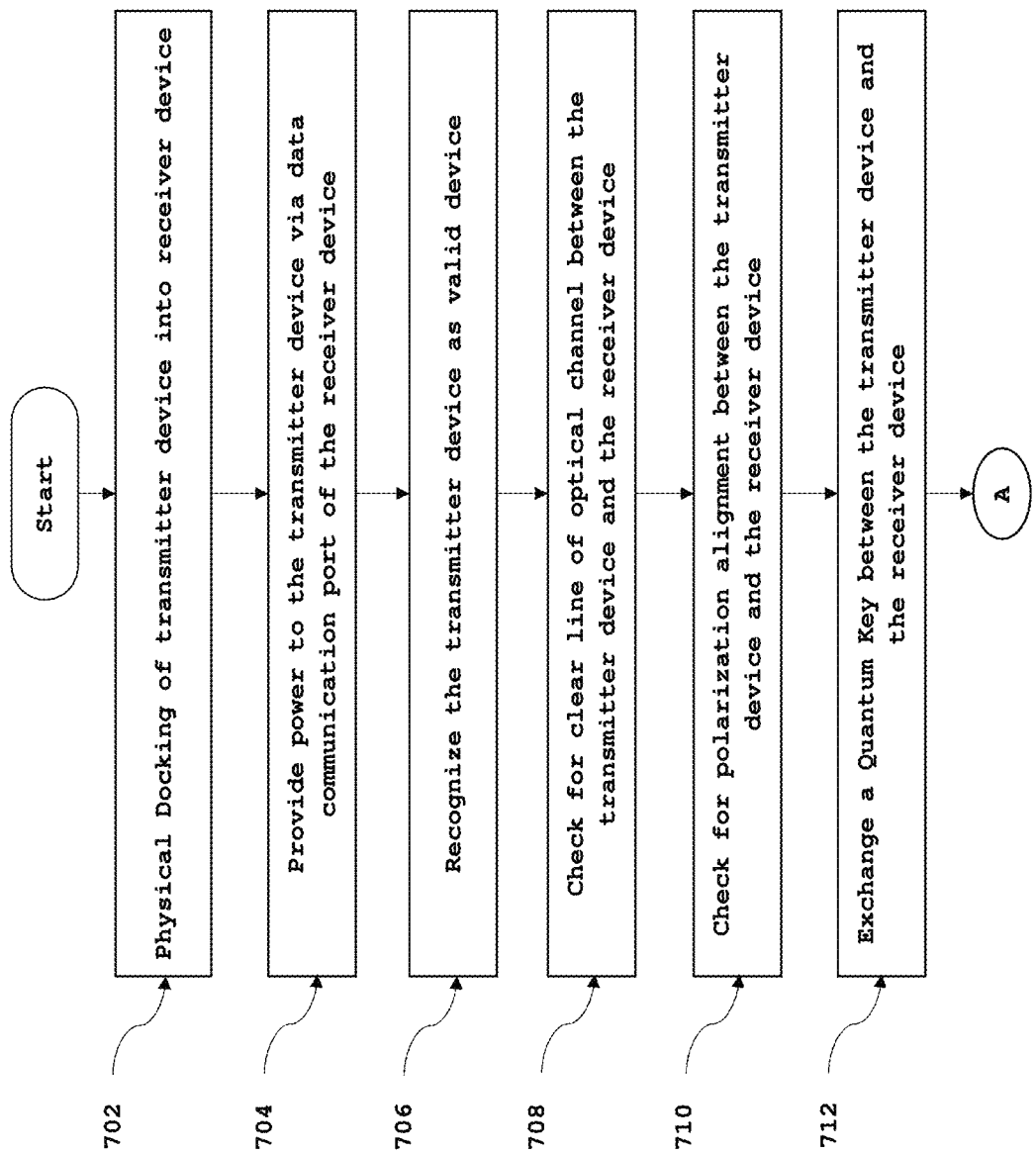
FIG. 7 is a flowchart illustrating a method for secure communication based on quantum cryptography, in accordance with various embodiments of the present invention.

FIG. 7 is a flowchart illustrating a method for secure communication between the Transmitter Device 100 and the Receiver Device 400 based on quantum cryptography, in accordance with various embodiments of the present invention.

At step 702, physical docking of the Transmitter Device 100 is ensured when the Transmitter Device 100 is inserted into the Receiver Device 400. The one or more Alignment Rod(s) 503 of the receiver device 400 is inserted into the one or more Alignment Guide(s) 203 of the transmitter device 100 for inserting the transmitter device (100) into the receiver device (400). When the spring-loaded one or more Dock Lock(s) 504 of the receiver device 400 reach the one or more Dock Lock Guide(s) 204 of the transmitter device 100, the spring in the one or more Dock Lock(s) 504 expands thereby ensuring soft locking. The soft locking ensures protection against accidental bumps and slope of docking station of the Receiver Device 400. It also helps the user in removing the Transmitter Device 100 by applying pressure and thus un-locking the soft lock.

At step 704, power is provided to the Transmitter Device 100 when the Data Port 202 is docked into the Data Host 502. Once the power is provided to the Transmitter Device 100, first LED of the six Status Lights 206 glows indicating a status change, i.e. "power ON".

At step 706, the Transmitter Device 100 is recognized by the Receiver Device 400 as a valid device. The T3 108 interfaces with the R3 408 and device details of the Transmitter Device 100 are communicated to the Receiver Device 400 for recognition. Once the Transmitter Device 100 is recognized by the Receiver Device 400, second LED of the six Status Lights 206 glows indicating a status change, i.e. "Device Recognized". The transmitter device 100 recognition is carried out using a standard USB device enumeration process.

At step 708, the Receiver Device 400 checks for a clear line of the Optical Channel II 112 between the Transmitter device 100 and the Receiver Device 400. The T2 107 instructs the Light Source 102 to emit a bright light; the bright light is transmitted over the Optical Channel II 112, reflected by the Dichroic Mirror 402, and transmitted across to the Optical Alignment Detector 405. When the Optical Alignment Detector 405 detects the bright light, it communicates this bright light to the R2 407. The R2 407 communicates the received information from the Optical Alignment Detector 405 to the T2 107 via the Data Communication channel 113 between the R3 408 and the T3 108.

At step 710, the Receiver Device 400 checks for polarization alignment between the Transmitter device 100 and the Receiver Device 400. Once the polarization alignment is ensured, third LED of the six Status Lights 206 glows indicating a status change, i.e. "Optical Channel Aligned".

At step 712, a Quantum Key is shared between the Transmitter Device 100 and the Receiver Device 400 using a quantum cryptography protocol, e.g. BB84 protocol. Once the Quantum Key is shared, fourth LED of the six Status Lights 206 glows indicating a status change, i.e. "Channel Secure". In an embodiment of the present invention, sharing of the Quantum Key is implemented via any of the established standards like BB84 or Decoy State protocols. If the Optical Channel II 112 is found to be prone to tampering of the quantum key, then the user is alerted by the user interface at the Receiver Device 400 and the on-going transaction is aborted.

At step 714, the Receiver Device 400, via the Host Computer 409 instructs the user to select the card type that the user wants to use. The user can choose from a choice of 'Magstripe' or 'Chip'.

At step 716, the chosen type of the payment card is inserted into the Card Slot 207 is detected by the Transmitter Device 100.

At step 718, the Transmitter Device 100 instructs the Magstripe Adapter 110 to read the payment card information if the payment card is a magstripe card. Else, the Transmitter Device 100 instructs the Chip Adapter 109 to read the payment card information.

At step 720, the Quantum Key shared in Step 712 encrypts the payment card information associated with the user read in Step 718. Further, the encrypted information associated with the user is communicated through the Data Communication Channel 113 to the Receiver Device 400. Whenever, there is data communication between the Receiver Device 400 and the Transmitter Device 100 or vice versa, sixth LED of the six Status Lights 206 glows indicating a status change, i.e. "Communication in Progress".

At step 722, the user is required to provide a secure input (e.g. a PIN or biometrics or both) to the Receiver Device 400 for authentication. The Receiver Device 400 authenticates the user based on the secure input provided by the user. Once the user is authenticated, fifth LED of the six Status Lights 206 glows indicating a status change, i.e. "User Authenticated".

At step 724, the on-going transaction between the Transmitter Device 100 and the Receiver Device 400 is completed based on the inputs provided by the user at the user interface of the Host Computer 409.

At each of the steps 702-724, the Host Computer 409 receives status change information and the user interface of the Host Computer 409 displays it to the user.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A transmitter device for secure communication based on quantum cryptography, the transmitter device comprises:
 a processor executing program instructions stored in a memory and configured to:
  instruct a light source to generate light pulses comprising photons;
  receive the photons, via a plurality of optical channels I, for polarization into one or more first polarization states, wherein the photons are encoded based on the first polarization states;
  purify the encoded photons by using one or more optical filters, wherein the purification of the photons generates a pure coherent light comprising the encoded photons, and wherein the encoded photons are associated with a quantum key;
  combine the light pulses comprising the photons with the pure coherent light comprising the encoded photons for transmitting over an optical channel II; and
  instruct an alignment guide to enable physical docking of the transmitter device with a receiver device that receives the combined light pulses comprising the photons and the pure coherent light comprising the encoded photons.

2. The transmitter device as claimed in claim 1, wherein the light source is optically coupled to a polarizer module in the transmitter device via the plurality of optical channels I.

3. The transmitter device as claimed in claim 1, wherein the light source comprise four Light Emitting Diodes (LEDs) which are driven using a pulse mode for generating the light pulses, and wherein a polarizer module in the transmitter comprise at least four input ports, and wherein each of the four LEDs of the light source is connected to one of the four input ports of the polarizer module via one of the plurality of optical channels I.

4. The transmitter device as claimed in claim 1, wherein the first polarization states comprise 0° for a first optical channel, 90° for a second optical channel, 45° for a third optical channel and 135° for fourth optical channel of the plurality of optical channels I.

5. The transmitter device as claimed in claim 1, wherein the optical filters comprise a spatial filter and a spectral filter.

6. The transmitter device as claimed in claim 1, wherein a rate of the encoded photons is reduced to one photon per pulse for making the optical channel II quantum secure.

7. The transmitter device as claimed in claim 1, wherein a chip adapter in the transmitter device reads a chip-based card when inserted into the transmitter device, and wherein a magstripe adapter in the transmitter device reads a magnetic-strip based card when inserted into the transmitter device, and wherein a status display in the transmitter device is controlled for displaying status of a transaction, and wherein the status display comprises six Light Emitting Diodes (LED) on a front side of the transmitter device, and wherein the six LEDs glow upon status change of a transaction.

8. The transmitter device as claimed in claim 1, wherein the transmitter device comprises an optical port and a data port on a rear surface.

9. The transmitter device as claimed in claim 1, wherein the transmitter device comprises a pair of dock lock guides and a pair of finger grips on a first side surface and a second side surface, and wherein the pair of finger grips are present on a top surface and a bottom surface, and wherein the pair of dock lock guides ensure locking of the transmitter device and provides protection against misalignment, and wherein the pair of finger grips enables the transmitter device to be held by a user.

10. The transmitter device as claimed in claim 1, wherein the transmitter device comprises a data port for deriving power when inserted into a data host device and supplies power to various components of the transmitter device and wherein the data port comprises a type-B Universal Serial Bus (USB), a type-C USB or a Tip Ring Ring Sleeve (TRRS) type.

11. The transmitter device as claimed in claim 1, wherein the optical channel II is a free-space medium, and wherein the transmitter device comprises a card slot in the form of a slit which is present at a front side of the transmitter device for inserting a payment card.

12. A receiver device for secure communication based on quantum cryptography, the receiver device comprises:
   a dichroic mirror configured to receive a combined light pulses comprising photons and a pure coherent light comprising encoded photons from an optical channel II; and
   a processor executing program instructions stored in a memory and configured to:
   adjust polarization detection optics of the receiver device based on the combined light pulses comprising photons and a pure coherent light comprising encoded photons;
   transmit the encoded photons associated with a quantum key for quantum key exchange for routing the encoded photons through a set of polarizers to generate polarized photons;
   detect a second polarization state associated with the polarized photons;
   provide physical docking of a transmitter device; and
   display status of a transaction between the transmitter device and the receiver device subsequent to detection of the second polarization state associated with the polarized photons.

13. The receiver device as claimed in claim 12, wherein the dichroic mirror splits the received light pulses into a first portion of the light pulses which are reflected by the dichroic mirror and a second portion of the light pulses which are transmitted through the dichroic mirror, and wherein the splitting of the light pulses is based on different wavelengths of the light pulses, wherein the adjusting of the polarization detection optics of the receiver device determines absence of relative difference between a polarization carried out by the transmitter device and the receiver device.

14. The receiver device as claimed in claim 12, wherein the receiver device comprises an optical mechanism including an adjustable frame, and wherein the adjustable frame provides orientation for maximum and minimum intensity of received light pulses providing aligned polarization biases of the transmitter device and the receiver device, and wherein a first portion of the light pulses is transmitted to an optical alignment detector present in the receiver device, and wherein subsequent to detection of the first portion of the light pulses the optical alignment detector enables determining whether the optical channel II is clear for optical communication or not clear for optical communication.

15. The receiver device as claimed in claim 12, wherein status messages of the transaction between the transmitter device and the receiver device are sent to a host computer in the receiver device, and wherein the host computer includes a user interface for displaying status messages of the transaction between the transmitter device and the receiver device.

16. The receiver device as claimed in claim 12, wherein a pair of alignment rods in the receiver device provides physical docking of the transmitter device when the transmitter device is inserted into the receiver device, and wherein the pair of alignment rods are fixed on a flat surface of the receiver device, and wherein the pair of alignment rods protrude out perpendicularly from the flat surface.

17. The receiver device as claimed in claim 12, wherein the receiver device comprises a data host for providing data communication, via a data communication channel, between the receiver device and the transmitter device.

18. The receiver device as claimed in claim 16, wherein the receiver device comprises a pair of dock locks for providing locking of the transmitter device and provides protection against misalignment in case of slope and accidental bumps, and wherein the dock locks are in one of a relaxed state, when the transmitter device is not present in the receiver device and in a locked state, when the transmitter device is present in the receiver device, and wherein one of the dock locks is in a compressed state, when the pair of alignment rods is inserted into a pair of alignment guides and is not in a locked state.

19. A method for secure communication between a transmitter device and a receiver device based on quantum cryptography, the method comprising:
   inserting the transmitter device into the receiver device;
   recognizing the transmitter device by the receiver device;
   transmitting light over an optical channel II between the transmitter device and the receiver device subsequent to the recognition of the transmitter device by the receiver device;
   performing a check to determine a polarization alignment between the transmitter device and the receiver device; and
   sharing a quantum key between the transmitter device and the receiver device using a quantum cryptography protocol, wherein the quantum key encrypts information associated with a user for communicating between the transmitter device and the receiver device.

20. The method as claimed in claim 19, wherein the method comprises inserting one or more alignment rods of the receiver device into one or more alignment guides of the transmitter device for inserting the transmitter device into the receiver device, wherein a spring in one or more dock locks of the receiver device reaches one or more dock lock guides of the transmitter device, and wherein the spring in the dock locks expands providing locking.

21. The method as claimed in claim 19, wherein power is provided to the transmitter device when a data port of the transmitter device is docked into a data host of the receiver device, and wherein subsequent to providing the power to the transmitter device a first light emitting diode (LED) of one or more six status lights glows indicating a status change as "power ON".

22. The method as claimed in claim 19, wherein the method comprises interfacing a transmitter data communication module with a receiver data communication module for communicating device details of the transmitter device to the receiver device for recognition, and wherein subsequent to recognition of the transmitter device by the receiver device, a second LED of one or more six status lights glows indicating a status change as "device recognized", and wherein the transmitter device recognition is carried out using a standard USB device enumeration process, and wherein the method comprises checking by the receiver device for a clear line of the optical channel II between the transmitter device and the receiver device.

23. The method as claimed in claim 19, wherein the light is transmitted over the optical channel II and provided and reflected by a dichroic mirror in the receiver device, and wherein the light is transmitted across to an optical alignment detector for communicating to a receiver control module and to a transmitter control module via a data communication channel between the receiver data communication module and the transmitter control module, wherein subsequent to the polarization alignment, a third LED of one or more six status lights glows indicating a status change as "optical channel aligned".

24. The method as claimed in claim 19, wherein the quantum cryptography protocol comprises a BB84 protocol and decoy state protocol.

25. The method as claimed in claim 19, wherein subsequent to sharing of the quantum key a fourth LED of one or more six status lights glows indicating a status change as "channel secure", wherein the method comprises alerting the user via a user interface at the receiver device in the event the optical channel II is found to be prone to tampering of the quantum key and an on-going transaction is aborted, and wherein the information associated with the user relates to a payment card information.

26. The method as claimed in claim 19, wherein the information associated with the user is encrypted and communicated via a data communication channel to the receiver device, and wherein during a data communication between the receiver device and the transmitter device or vice versa, a sixth LED of one or more six status lights glows indicating a status change as "communication in progress".

27. The method as claimed in claim 19, wherein the method comprises providing a secure input to the receiver device for authentication, and wherein the secure input comprises at least a PIN and a biometrics, and wherein the receiver device authenticates the user based on the secure input, and wherein subsequent to the authentication of the user, a fifth LED of one or more six status lights glows indicating a status change as "user authenticated", and wherein a host computer receives status change information and a user interface of the host computer displays a status to the user.

* * * * *